United States Patent
Niespodziany et al.

(10) Patent No.: US 6,286,634 B2
(45) Date of Patent: Sep. 11, 2001

(54) METHOD OF CONVERTING AIRCRAFT BRAKE ASSEMBLIES

(75) Inventors: David A. Niespodziany, South Bend; Stanley W. May, Mishawaka, both of IN (US); Esaw Harris, Niles, MI (US); Andrew S. Haynes, New Carlisle, IN (US); Joseph M. Patko, South Bend, IN (US); Brian G. Harker, Granger, IN (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/769,895

(22) Filed: Jan. 25, 2001

Related U.S. Application Data

(62) Division of application No. 09/322,355, filed on May 28, 1999, now Pat. No. 6,205,633, which is a division of application No. 08/870,923, filed on Jun. 6, 1997, now Pat. No. 5,926,932.

(51) Int. Cl.$^7$ ..................................................... F16D 55/36
(52) U.S. Cl. ......................... 188/71.5; 29/426.1; 29/428; 29/401.1
(58) Field of Search .............................. 29/401.1, 426.1, 29/428; 188/71.5

(56) References Cited

U.S. PATENT DOCUMENTS

| | | | |
|---|---|---|---|
| 3,692,150 | * | 9/1972 | Ruppe, Jr. ............................. 188/71.5 |
| 3,887,041 | | 6/1975 | Malone ................................. 188/71.5 |
| 4,214,651 | * | 7/1980 | Cunningham ..................... 188/251 R |
| 5,107,968 | | 4/1992 | Delpassand .......................... 188/264 |
| 5,205,382 | | 4/1993 | Edmisten ............................. 188/71.5 |
| 5,255,761 | | 10/1993 | Zaremsky ............................. 188/71.5 |
| 5,321,876 | | 6/1994 | Massing et al. ..................... 29/401.1 |
| 5,485,898 | | 1/1996 | Patko .................................. 188/71.5 |
| 5,540,305 | | 7/1996 | Hammond ........................... 188/71.5 |
| 5,699,881 | * | 12/1997 | Berwangwer et al. ............. 188/71.5 |

FOREIGN PATENT DOCUMENTS

| 0716244 | 6/1996 | (EP) | ............................... F16D/55/40 |
|---|---|---|---|
| 0840 029A1 | 5/1998 | (EP) | ............................... F16D/55/36 |

OTHER PUBLICATIONS

Stimson: "First lightweight disc brakes for a civil airliner" Aircraft Engineering, vol. 43, No. 6, Jun. 1971, pp. 12–14, XP002076873 London GB.

* cited by examiner

*Primary Examiner*—I Cuda-Rosenbaum
*Assistant Examiner*—John C. Hong
(74) *Attorney, Agent, or Firm*—Larry J. Palguta

(57) ABSTRACT

A convertible aircraft brake assembly (10, 60, 77, 78, 83, 85, 96, 120, 130) designed as original equipment to have heat sinks comprising a steel heat sink (20, 70, 80, 90, 91, 100, 110, 122) aircraft brake assembly and a carbon-carbon composite heat sink (40) aircraft brake assembly. When the aircraft brake assembly is converted from one type of heat sink to the other, the conversion is accomplished with minimal changes in component parts. The conversion can be accomplished without any changes in the piston housing (14), torque tube (12), and wheel (30) because the heat sinks include therein respective components which enable each heat sink to be utilized with the commonly used piston housing (14), torque tube (12), and wheel (30).

16 Claims, 9 Drawing Sheets

METHOD OF CONVERTING AIRCRAFT BRAKE ASSEMBLIES

This is a division of U.S. patent application Ser. No. 09/322,355 filed May 28, 1999, now U.S. Pat. No. 6,250,633 which is a division of U.S. Pat. No. application 08/870,923 filed Jun 6, 1997, now 5,926,932.

The present invention relates generally to aircraft brakes, and in particular to aircraft brake assemblies that are convertible from a first type of heat sink to a second type of heat sink.

Steel heat sink aircraft brake assemblies have proven to be economical, reliable, and desirable for aircraft that fly relatively short distances. Steel heat sink aircraft brake assemblies are still state of the art in the aerospace industry. Such brake assemblies typically include either steel rotor or stator disks and a corresponding plurality of friction material rotor or stator disks. Carbon-carbon composite heat sink aircraft brake assemblies are increasing in their usage as the size of commercial aircraft and their flying distance has increased. As disclosed in co-owned Massing et al. U.S. Pat. No. 5,321,876, commercial aircraft flying long distances or long hauls may increase revenue and/or reduce operating costs by utilizing the significant weight benefits offered by a carbon-carbon composite heat sink as compared to a generally heavier steel heat sink. However, if an aircraft with carbon-carbon composite heat sinks is scheduled to fly a short haul, the use of such heat sinks may not be cost effective. Massing et al. U.S. Pat. No. 5,321,876 discloses a method of converting aircraft brake assemblies from a first heat sink to a second heat sink, wherein different piston bushing assemblies, backing plate connectors and heat shields are utilized for the respective heat sinks. It is highly desirable that an aircraft brake assembly suitable for utilization of either a carbon-carbon composite heat sink or a steel heat sink can be easily converted from one heat sink to the other. It is an object of the present invention to simplify the method of converting aircraft brake assemblies, and thus avoid the distinct disadvantages of converting or retrofitting an existing brake assembly from a carbon-carbon composite heat sink to a steel heat sink which could result in a heavier steel aircraft brake assembly than a brake assembly designed originally to be only a steel aircraft brake assembly. With the present invention, an airline would be able to utilize any of several methods for converting the aircraft brake assemblies and thus can order a group or fleet of aircraft suitable for long and short hauls, with the long haul aircraft utilizing carbon-carbon composite heat sink brake assemblies while the short haul aircraft utilize steel heat sink aircraft brake assemblies. Other reasons for converting may include airline maintenance cost and capabilities, fluctuating fuel costs or flight weight limitations. Also, should changes in aircraft scheduling occur, the particular type of heat sink utilized in the brake assemblies can be converted easily to a different type of heat sink. The present invention provides solutions to the above problems by providing a method of converting an aircraft brake assembly designed as original equipment to be convertible from a first heat sink of one of carbon and steel brake assemblies to a second heat sink of the other of carbon and steel brake assemblies, the aircraft brake assembly for connection with a surrounding wheel via rotor disks of the respective heat sink, each heat sink including a plurality of rotor disks and stator disks, the brake assembly comprising the first heat sink, a torque tube connected with the stator disks of the first heat sink and including a backing plate having pad means for engaging an adjacent disk, and a piston housing connected with the torque tube wherein pistons of the housing are located a distance from said backing plate, comprising the steps of: disassembling the piston housing, first heat sink, and torque tube, and assembling the second heat sink with the torque tube and connecting the piston housing with the torque tube via an intermediate member which extends the distance the pistons are located from the backing plate.

The invention is described in detail below with references to the drawings which illustrate a plurality of embodiments in which.

The same or similar structures will be identified by the same reference numerals in the drawings.

Figure 1:
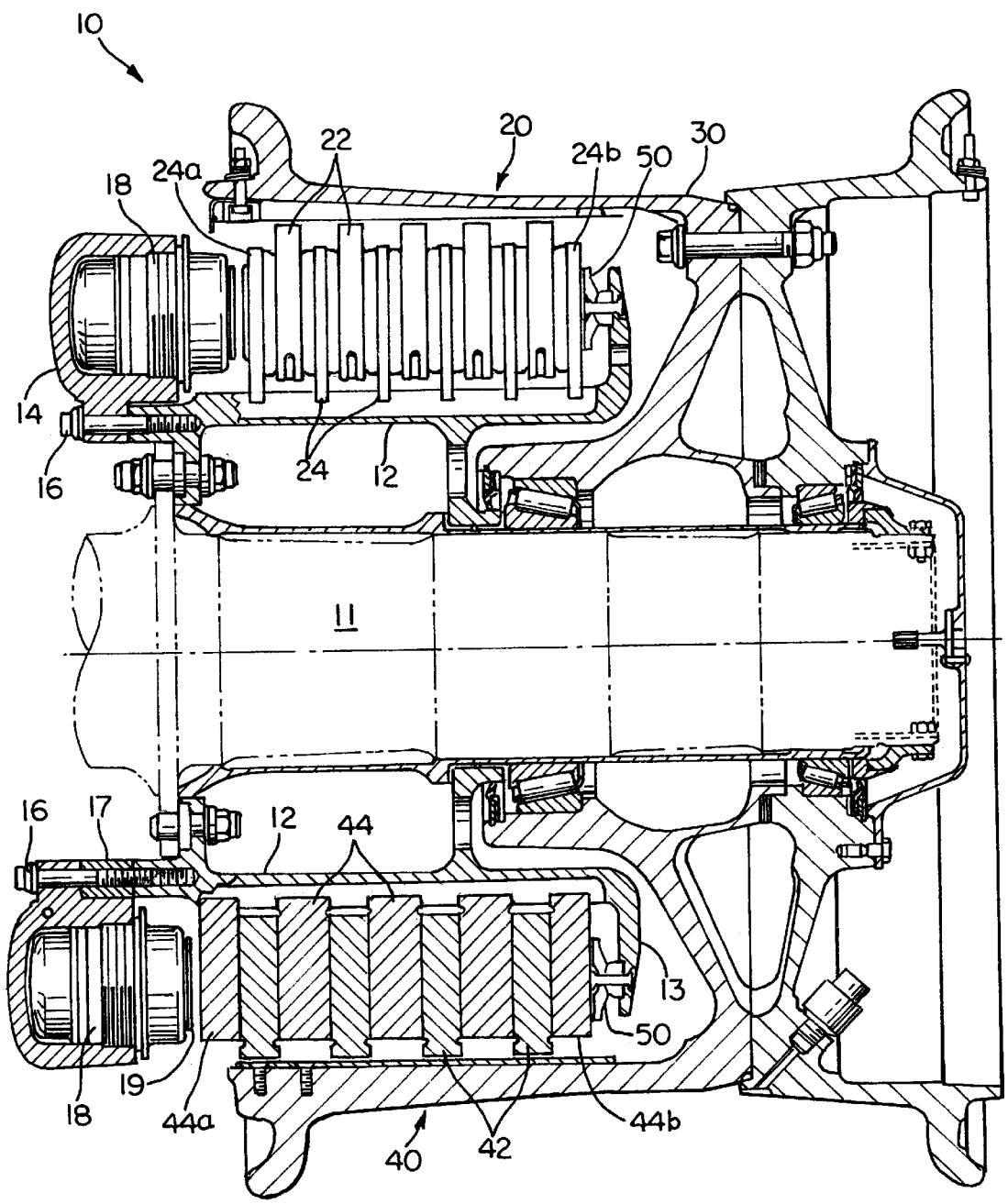
FIG. 1 is an illustration of an aircraft brake assembly convertible by means of an intermediate member.

FIG. 1 illustrates an aircraft brake assembly with different first and second heat sinks shown in the top and bottom portions of the drawing only for illustrative purposes. In the upper portion of the drawing of the preferred embodiment of a convertible brake assembly, the aircraft brake assembly 10 includes a torque tube 12 attached to a piston housing 14 by a plurality of bolts 16. Piston housing 14 includes a plurality of piston bushing assemblies 18 with pistons 19. The steel heat sink designated generally by reference numeral 20 includes a plurality of steel rotor disks 22 that engage, via spline and slot engagements, the surrounding wheel 30, as is well known in the art, and a plurality of friction material disks 24 engaging the torque tube 12 via the well known spline and slot engagement. It should be clearly understood that the rotors and stators can, as is well known in the art, be reversed such that the rotors which are keyed to the wheel have friction material thereon, while the stators which are keyed to the torque tube are essentially steel plates for engagement with the friction material of the rotors. Thus, each steel brake embodiment disclosed herein can comprise either one of these well-known constructions (eg. friction material linings on either the stators or rotors).

In order to convert the brake assembly 10 from one having the steel heat sink 20 to a carbon-carbon composite heat sink designated by reference numeral 40 in the lower part of the drawing, the brake assembly 10 is disassembled wherein the piston housing 14, torque tube 12 and heat sink 20, once removed from the axle 11, are disconnected from one another. The carbon-carbon composite heat sink 40, which comprises a plurality of rotor disks 42 and stator disks 44, is assembled on the torque tube as shown in the lower portion of the drawing, such that the backing plate stator disk 44a contacts the pad 50. The pad 50 is a typical swivel pad utilized with carbon-carbon composite disks, but which in brake 10 is also utilized to engage the backing plate disk 24b of steel heat sink 20. The piston housing 14 is attached to the torque tube 12 by means of the bolts 16 and an intermediate annular spacer member 17. As can be readily seen in FIG. 1, the spacer member positions the piston housing 14 at a distance further away from the backing plate 13 of the torque tube 12, thus accommodating the longer axial length carbon-carbon composite heat sink 40. Thus, brake assembly 10 has been converted from a steel heat sink 20 to a carbon-carbon composite heat sink 40 by means of the addition of the intermediate annular spacer member or ring 17. The same piston bushing assemblies 18 are used with each heat sink 20 and 40. The brake assembly utilizes the pad backing plate means 50 with both heat sinks, rather than utilizing a friction material disk attached directly to the backing plate 13 of torque tube 12 as is typical in a steel heat sink brake (friction material backing plate disks are typically riveted to the backing plate 13 in steel heat sinks). Thus, the pad means is used with both heat sinks, and the pressure plate/backing plate disks 24a/24b and 44a/44b are interchangeable within their respective heat sinks. To convert the brake from one with carbon-carbon composite heat sink 40 to steel heat sink 20, the above steps are simply reversed.

Figure 2:
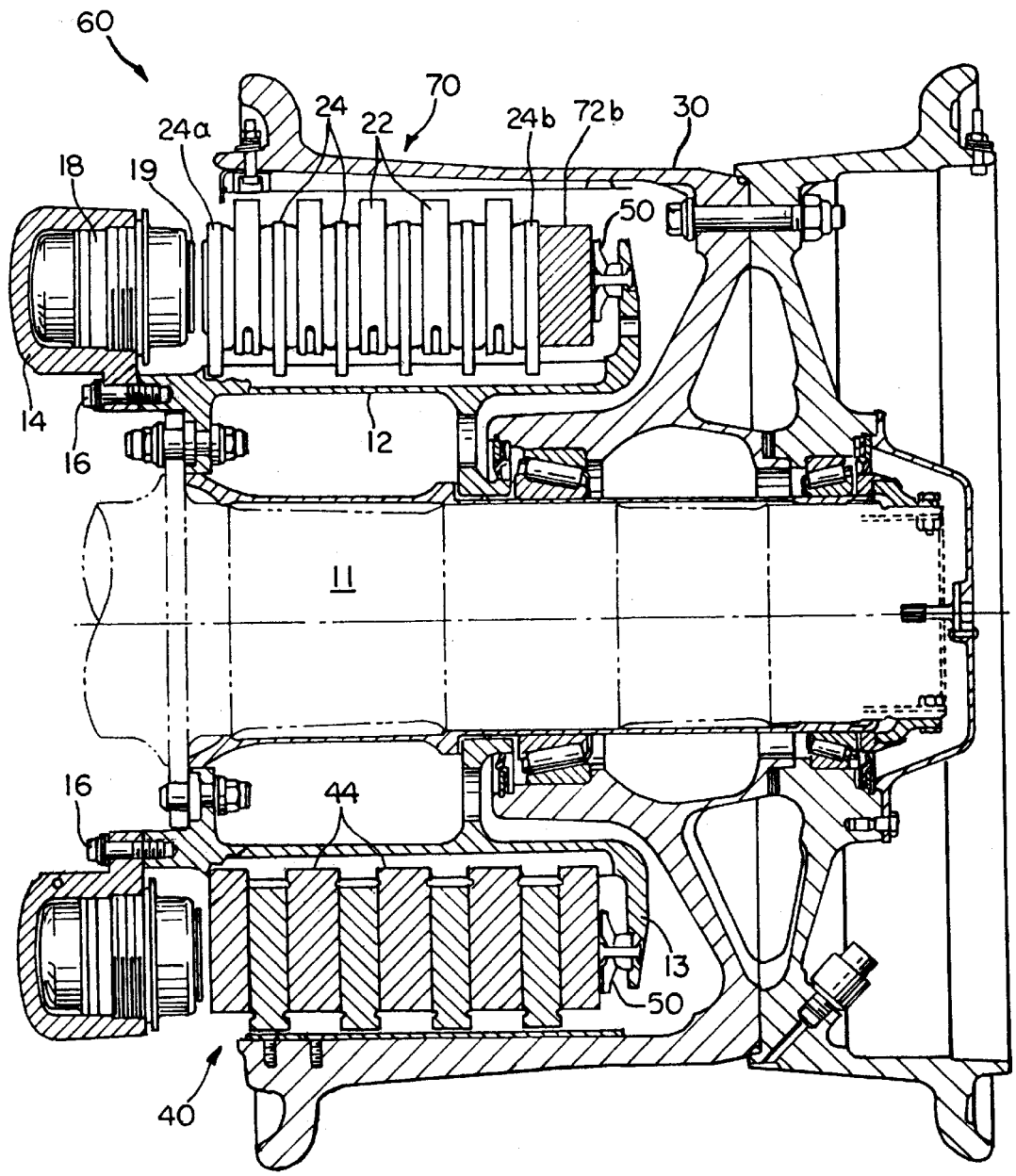
FIG. 2 is an illustration of an aircraft brake assembly convertible by means of an enlarged plate member disposed between the backing plate disk and backing plate pad which does not cover the present claimed invention.

FIG. 2 illustrates a convertible brake assembly designated generally by reference numeral 60. Brake assembly 60 includes the swivel pad means or assemblies 50 discussed above, wheel 30, torque tube 12, piston housing 14, attachment bolts 16 which comprise connecting means, and plurality of piston bushing assemblies 18 with pistons 19. As illustrated in FIG. 2, the carbon-carbon heat sink 40 shown in the bottom of the drawing is changed to the steel heat sink designated generally by reference numeral 70 in the upper portion of the drawing during the conversion of the brake. When the piston housing 14 is separated from the torque tube 12 and the carbon heat sink 40 removed therefrom, the steel heat sink 70 (stator disks 24 and rotor disks 22) is positioned on the torque tube 12 and the piston housing 14 reattached via bolts 16 to the torque tube 12. The steel heat sink 70 includes an enlarged stator plate spacer disk 72b which is connected (by means of rivets or other connection means not shown) with the backing plate disk 24b (disk 72b can also be connected with disk 24a). Thus, the extended length stator plate spacer disk 72b enables the filling up of the heat sink envelope so that pressure disk 24a of heat sink 70 is positioned at substantially a desired axial separation distance from adjacent pistons 19, as also illustrated below for the adjacent stator disk 44 of carbon heat sink 40. Spacer disk 72b may be a carbon-carbon composite disk or other suitable material.

Each of the carbon heat sinks 40 illustrated in FIGS. 3–9 are changed to the respective steel heat sinks of the convertible brake assemblies illustrated by the steps of separating the piston housing 14 from the torque tube 12, removing the carbon heat sink 40 from the torque tube 12, positioning the respective steel heat sink on the torque tube 12, and connecting the piston housing 14 with the torque tube 12. In each instance, the pistons 19 will be positioned at substantially the desired axial separation distance from the adjacent disk of the respective steel heat sink, the desired axial separation distance also being illustrated in the lower part of each drawing for the respective carbon heat sink 40. All of the embodiments of the invention utilize the pad means 50 with both types of heat sinks.

Figure 3:
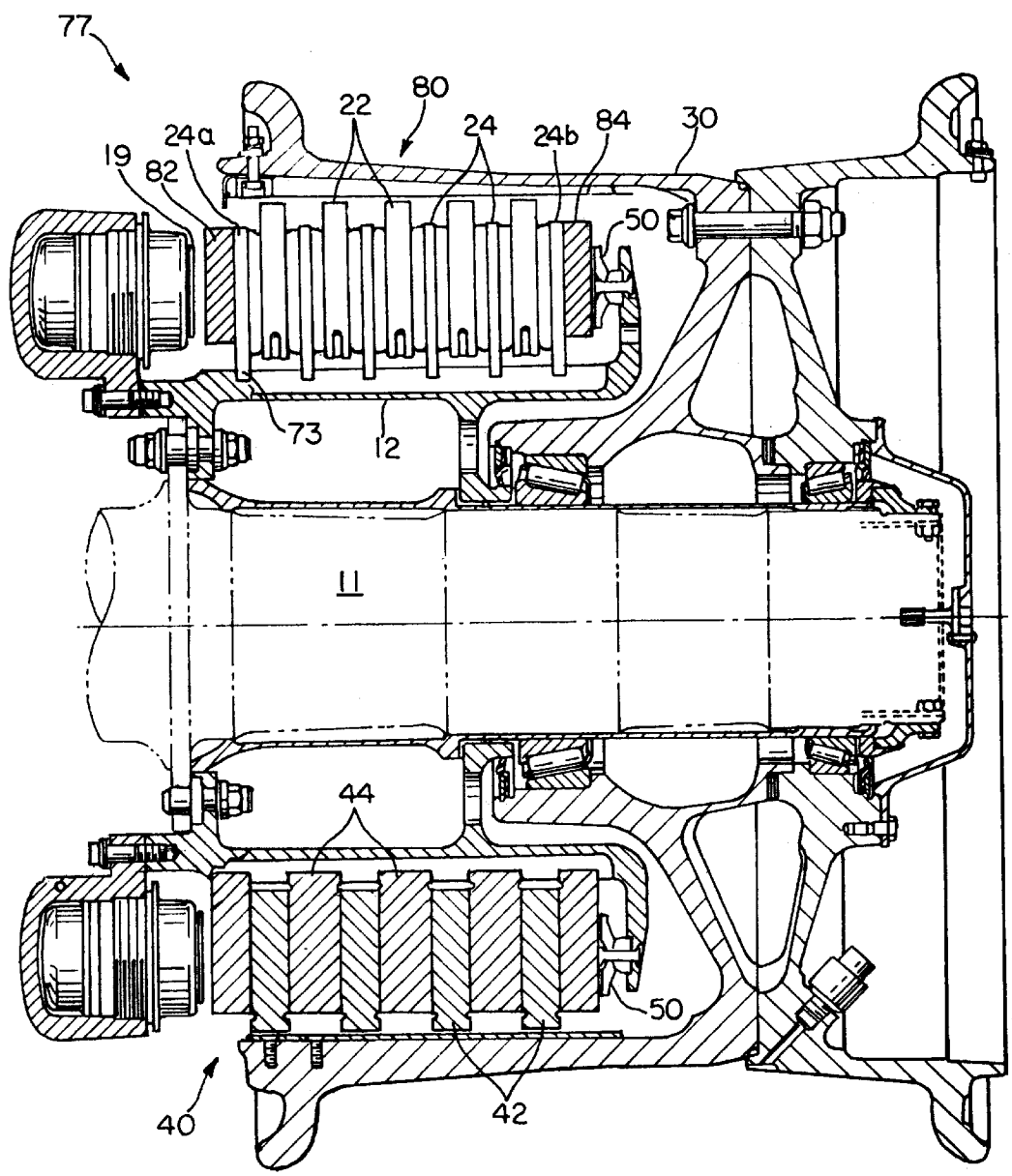
FIG. 3 is an illustration of an aircraft brake assembly that is convertible by means of a pair of plate members attached to the backing plate and pressure plate disks, which does not cover the present claimed invention.

As illustrated in FIG. 3, the carbon heat sink 40 in the lower portion of the drawing is changed to a steel heat sink 80 illustrated in the upper portion of the drawing during conversion of the convertible brake 77. The steel heat sink 80 includes a pair of spacer disks 82 and 84, with spacer disk 82 attached to pressure plate 24a and spacer disk 84 attached to backing plate 24b. Thus, a pair of spacer plates, which may be made of carbon-carbon composite material or any other suitable material such as metal, are utilized to extend the length of steel heat sink 80 so that the spacer disk 82 is positioned at a predetermined separation distance from the plurality of pistons 19. Again, the pad assemblies or means 50 are common to both brakes, and the pressure plate disk 24a with attached spacer disk 82 and backing plate disk 24b with attached spacer disk 84 are interchangeable within the brake.

Figure 4:
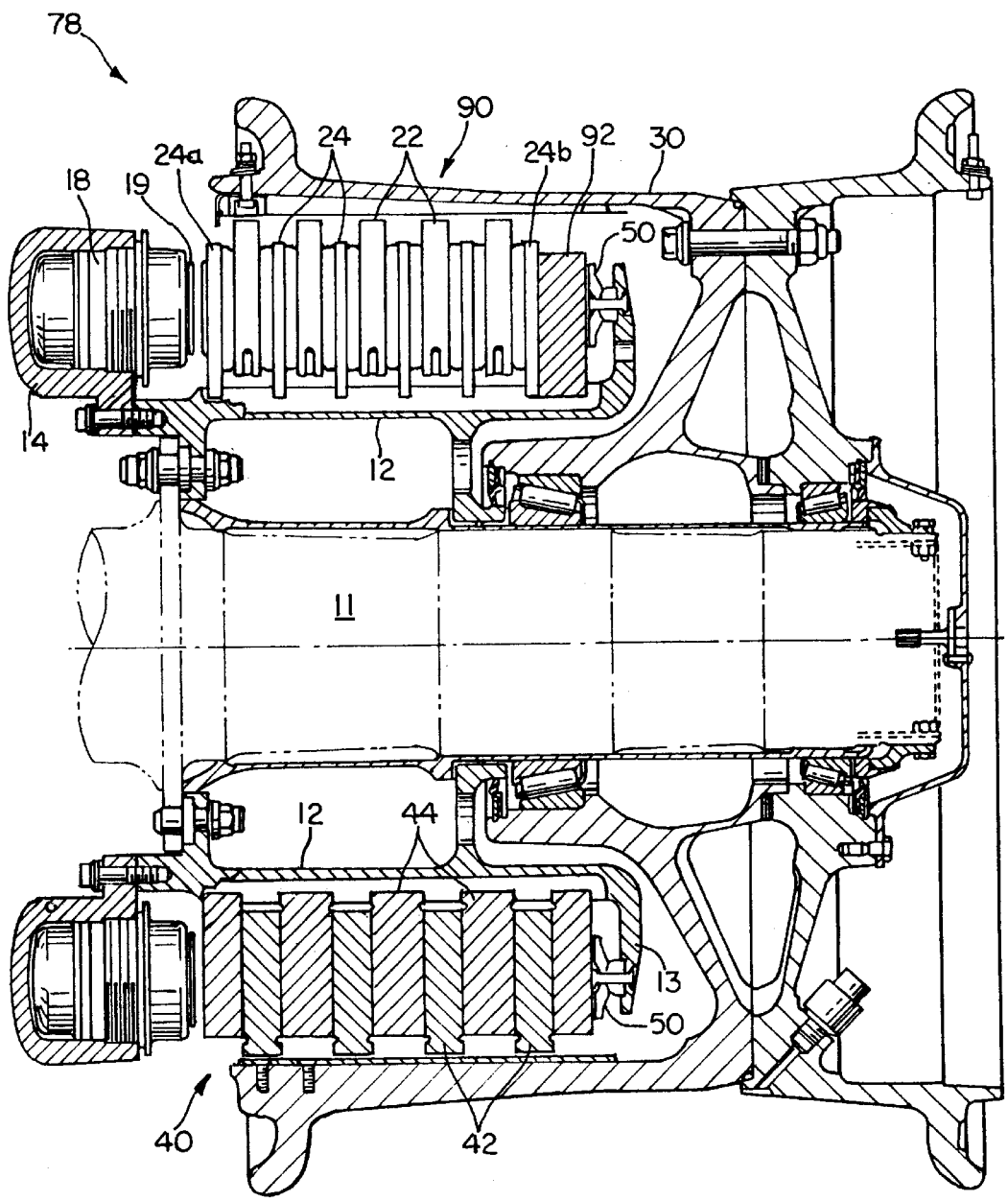
FIG. 4 is an illustration of an aircraft brake assembly that is convertible by means of an enlarged disk slidably mounted upon the torque tube and located adjacent the pad means, which does not cover the present claimed invention.
Figure 5:
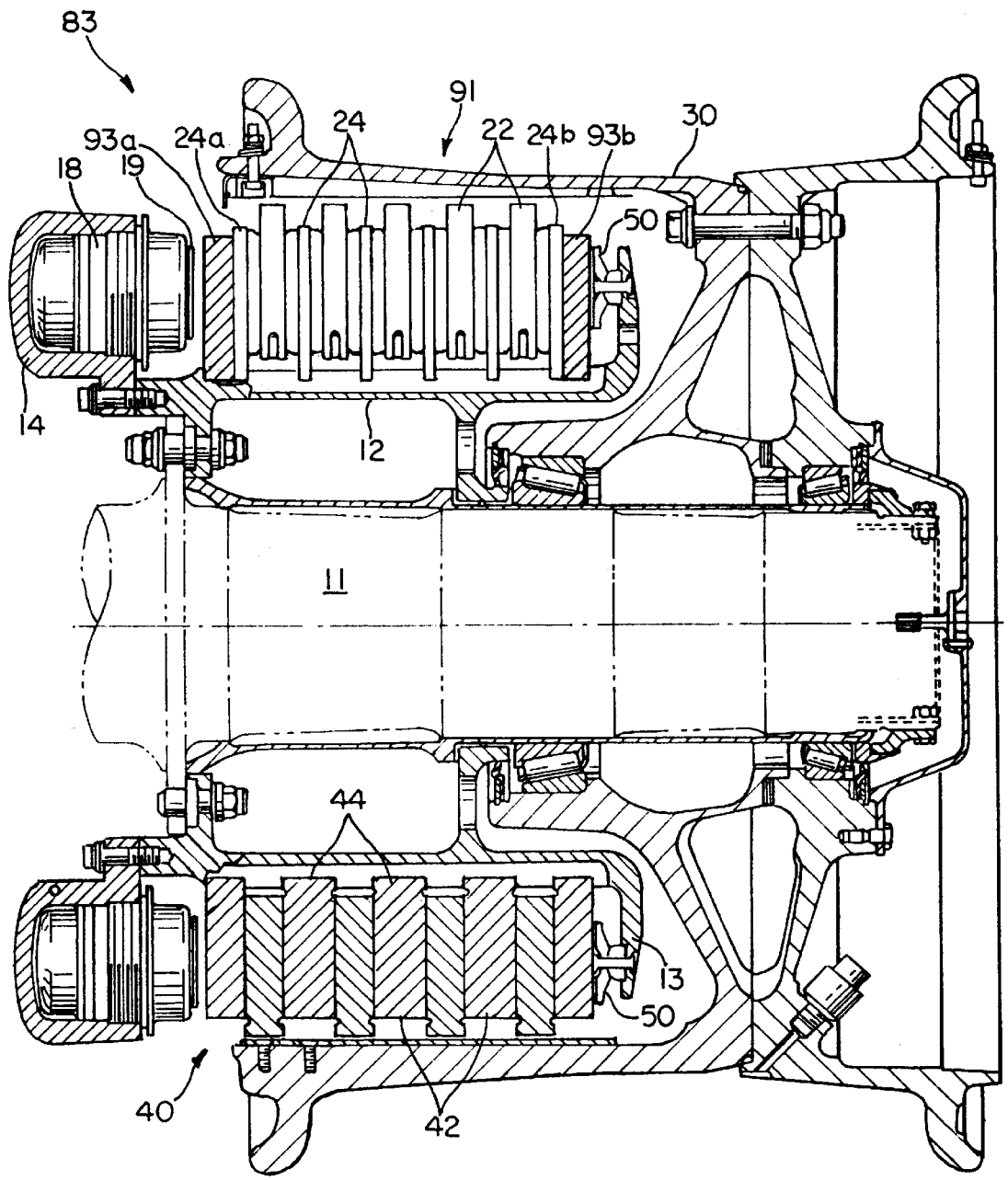
FIG. 5 is an illustration of an aircraft brake assembly similar to that illustrated in FIG. 4 but including two disks slidably mounted on the torque tube, one engaging the pad means and the other engaging the pressure plate disk, which does not cover the present claimed invention.

FIG. 4 illustrates a convertible brake 78 wherein the carbon heat sink 40 of the brake is changed to the steel heat sink designated generally by reference numeral 90. The steel heat sink 90 includes an enlarged spacer disk 92 (made of carbon-carbon composite or other suitable material such as metal) which has a central opening with notches or slots thereabout such that it is slidably mounted upon the torque tube 12 by the typical spline and slot connection (disk 92 can also be placed adjacent disk 24a). Spacer disk 92 need not be attached to the backing plate disk 24b because it is slidably mounted upon the torque tube 12. Thus, the spacer disk 92 extends the overall axial length of heat sink 90 such that pressure plate disk 24a is disposed at a predetermined separation distance from the plurality of pistons 19. FIG. 5 illustrates a similar embodiment wherein the spacer disk 92 of FIG. 4 takes the form of two separator or spacer disks 93a and 93b both of which in steel heat sink 91 of convertible brake 83 are slidably mounted upon the torque tube in the same manner as illustrated in FIG. 4, with one spacer disk 93b disposed between the pad means 50 and backing plate disk 24b and the other spacer disk 93a disposed between the plurality of pistons 19 and the pressure plate disk 24a.

Figure 6:
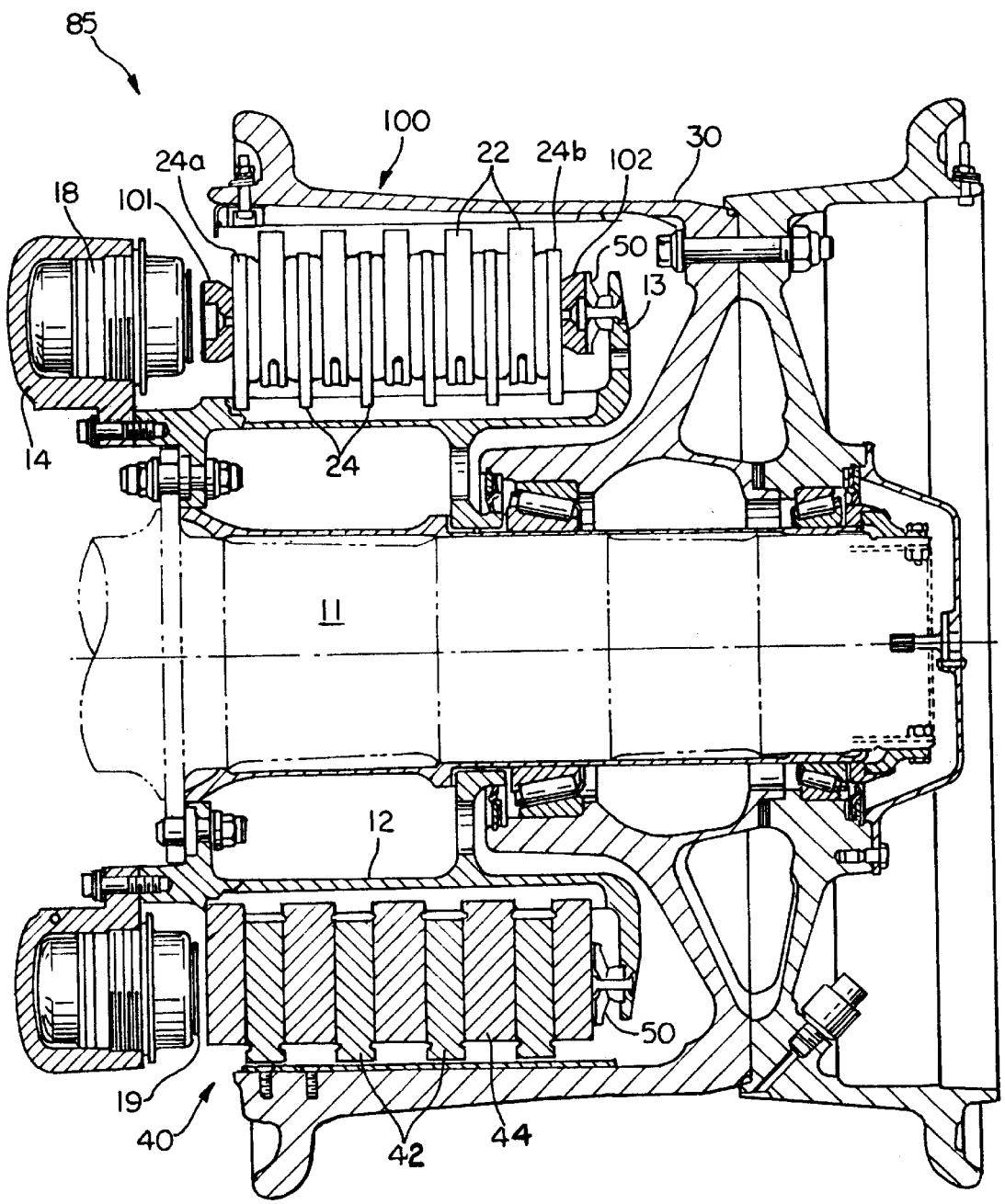
FIG. 6 is an illustration of an aircraft brake convertible by means of a pair of steel plates or spacer disks attached to the pressure plate and backing plate disks, which does not cover the present claimed invention.

FIG. 6 illustrates a convertible aircraft brake similar to that of FIG. 3 and designated generally by reference numeral 85 wherein the carbon heat sink 40 in the lower portion of the figure is changed to a steel heat sink 100 wherein the steel heat sink includes at opposite ends thereof spacer disks 102 and 101 (made of carbon-carbon composite material or any other suitable material) which are attached by rivets or other suitable means to the backing plate disk 24b and pressure plate disk 24a, respectively. Again, the pair of spacer disks extend the overall axial length of the steel heat sink 100 such that spacer disk 101 is located at a predetermined distance from the plurality of pistons 19. Spacer disk 102 engages pad means 50.

Figure 7:
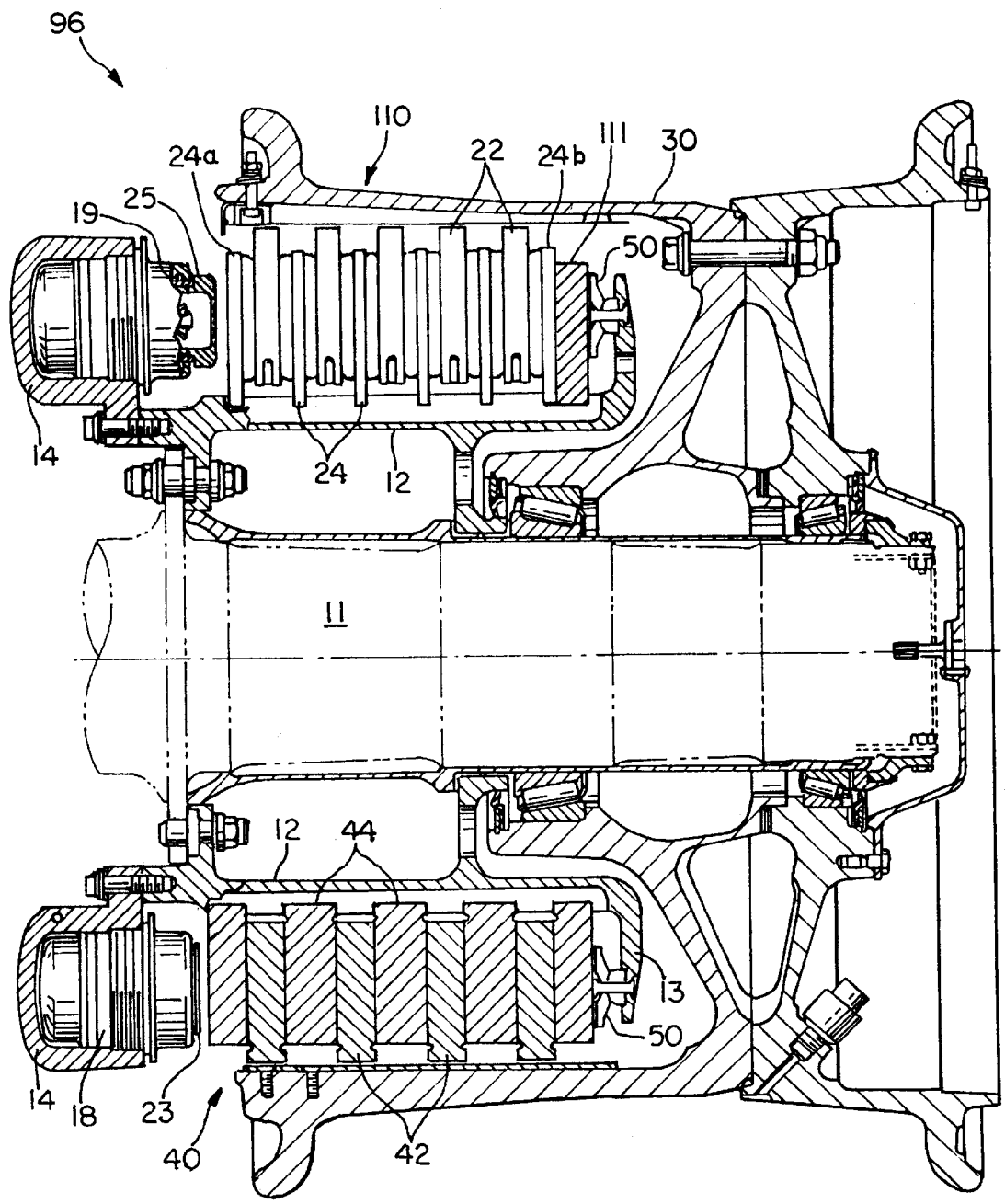
FIG. 7 is an illustration of an aircraft brake assembly convertible by either extended length piston caps attached to the pistons or extended length piston caps attached to the pistons in combination with an enlarged disk slidably mounted upon the torque tube and engaging the pad means, which does not cover the present claimed invention.

FIG. 7 illustrates two embodiments of a convertible brake assembly 96. The carbon heat sink 40 in the lower portion of the drawing may be changed to the steel heat sink 110 illustrated in the upper portion of FIG. 7 wherein the pistons 19 of the bushing assemblies 18 illustrated in the lower portion of the figure have their caps 23 removed during disassembly and have assembled thereto a plurality of extended axial length caps 25. Thus, convertible brake 96 illustrated in FIG. 7 may comprise a steel heat sink assembly 110 wherein only the extended axial length caps 25 attached to the plurality of pistons 19 of piston bushing assemblies 18 are utilized to locate the piston caps at a predetermined separation distance from the pressure plate disk 24a. In FIG. 7, the axial length of the piston caps 25 would be greater than that shown in the absence of the spacer disk 111. However, if shorter extended axial length piston caps 25 are desired, the illustrated shorter extended axial length piston caps 25 may be used in combination with the spacer disk 111 which is slidably mounted upon the torque tube 12 through the typical spline and slot connection or in combination with any of the other spacer disks disclosed in this patent application. Spacer disk 111 may be a carbon-carbon composite or any suitable material disk which is engaged on one side by the common pad means 50 and on the other side by the backing plate disk 24b. Thus, the use of spacer disk 111 enables the use of piston caps 25 having a shorter axial length than would be required in the absence of spacer disk 111. The embodiments of FIG. 7 provide a more reliable and economically feasible convertible brake assembly than one which utilizes an integral piston/cylinder adjuster assembly (extensible piston assembly) which changes the piston head length as the piston extends in order to accommodate different length heat sinks.

Figure 8:
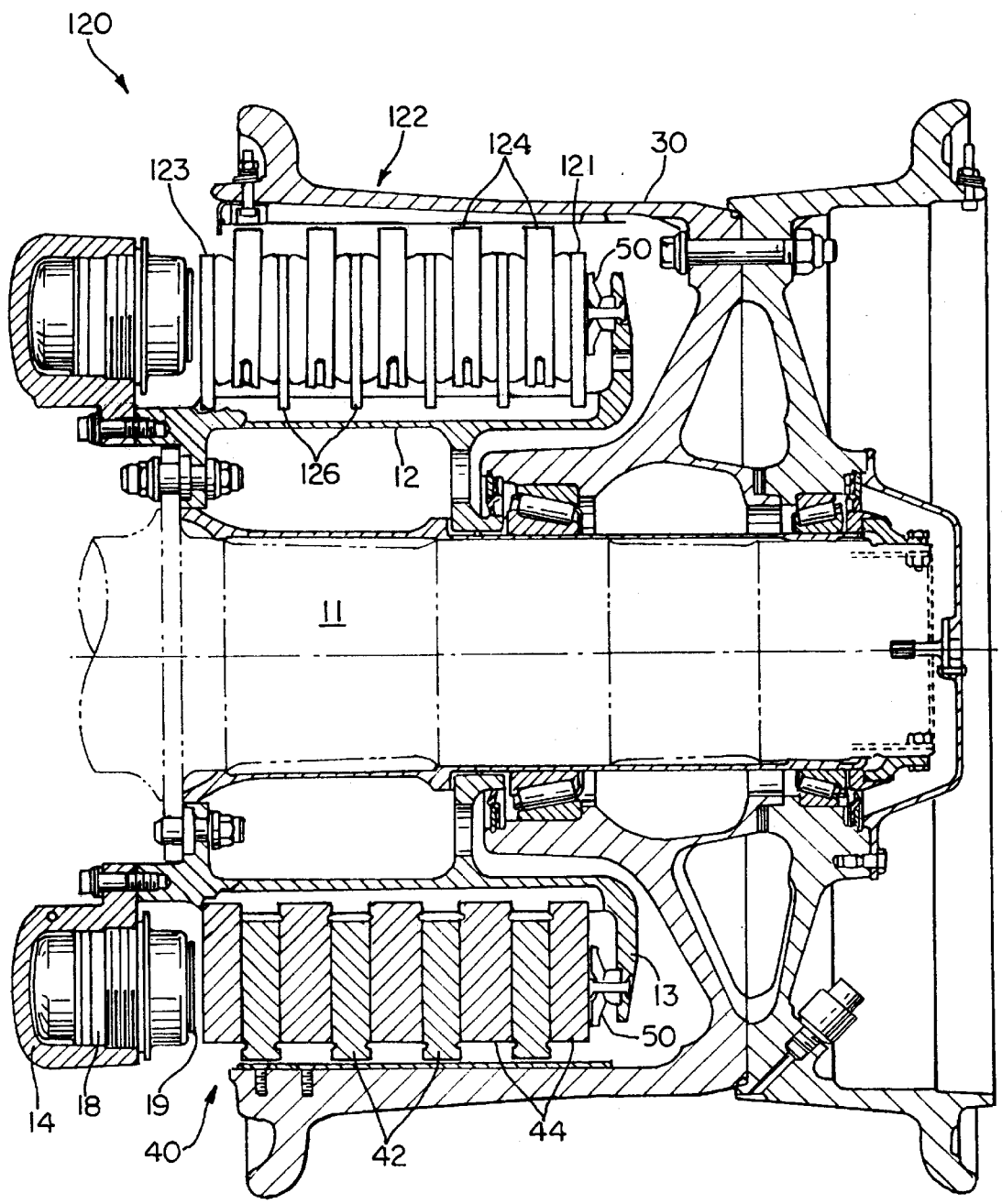
FIG. 8 is an illustration of an aircraft brake assembly convertible by means of stator disks of the second heat sink having an enlarged axial length compared to the axial length of a typical heat sink of the same friction material, which does not cover the present claimed invention.

FIG. 8 illustrates a convertible brake assembly 120 which includes a carbon heat sink 40 which is changed to a steel heat sink 122 wherein the stator disks 126 each have an increased axial width or length as compared to the corresponding axial width or length of stators in a typical steel heat sink. Thus, by increasing the axial length or width of the stator disks, the pressure plate disk 123, interchangeable with the backing plate disk 121, is positioned at a predetermined separation distance from the plurality of pistons 19. The rotor disks 124 can also have a slightly increased axial width or thickness, if desired. Because the rotors experience only a fraction of the wear experienced by the friction material linings of the stator disks, the rotor disks would have very little increase in thickness.

Figure 9:
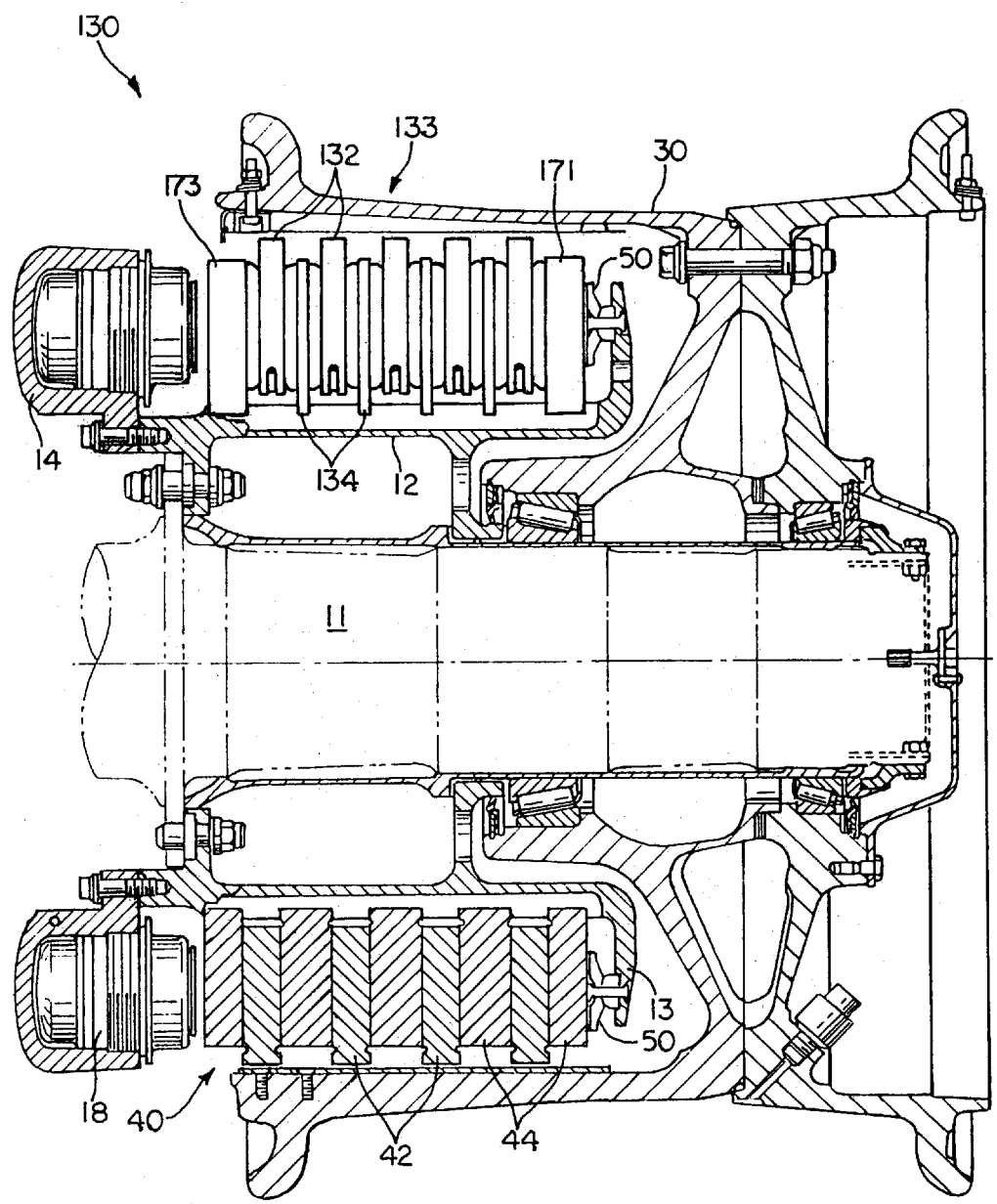
FIG. 9 is an illustration of an aircraft brake assembly convertible by means of the pressure plate and backing plate disks of the second heat sink having an enlarged axial length as compared to the corresponding disks in the first heat sink, which does not cover the present claimed invention.

FIG. 9 illustrates a convertible brake assembly 130 which includes a carbon heat sink 40 illustrated in the lower portion of the drawing and which can be changed to a steel heat sink 133. Steel heat sink 133 has rotor disks 132 and stator disks 134 which have essentially the same axial lengths or widths as are typical in a steel heat sink. However, the pressure plate 173 and backing plate disk 171 each have an increased axial width such that the pressure plate disk 173 is disposed at a predetermined separation distance from the plurality of pistons 19 of piston bushing assemblies 18.

In FIGS. 2–9, the steel heat sinks may be changed back to the carbon-carbon composite heat sinks by simply reversing the steps of converting the brake. Likewise, in FIG. 1 the carbon-carbon composite heat sink may be changed back to the steel heat sink by simply reversing the steps of converting the brake.

The convertible brake assemblies described above and illustrated in the drawings provide a more simply convertible brake which requires minimal changes in component parts. The brake assemblies all utilize, with either a steel heat sink or carbon heat sink, a common swivel pad means 50 which engages adjacent disks, spacers, or plates of both types of heat sinks. Additionally, the correspondingly shaped recesses typically utilized in carbon-carbon composite backing plate disks to receive the pad means are not utilized; the surface of the carbon-carbon composite backing plate disk does not have any recesses and the essentially flat surface engages the plurality of pad means 50. The brake assemblies disclosed and illustrated herein all have interchangeable pressure plate disks and backing plate disks within the respective heat sinks. This is a substantial advantage in that the number of different part numbers for the brake are reduced, and one part number can be used commonly at two positions within the respective heat sink of a brake assembly. The convertible brake assemblies permit an airline to purchase an aircraft which can be utilized for different lengths of flights, with long haul designated aircraft utilizing carbon-carbon composite heat sink brake assemblies which may be more economical for such flights, while the short haul designated aircraft can use steel heat sink aircraft brake assemblies which are economical for short hauls. Other reasons for converting may include airline maintenance cost and capabilities fluctuating fuel costs or flight weight limitations. Should flight scheduling change or the airline decide to change some aircraft from one designated group to another designated group, the particular type of heat sink can be converted easily to the other type of heat sink and enable the airline to optimize operating costs.

What is claimed is:

1. A method of converting an aircraft brake assembly designed as original equipment to be convertible from a first heat sink of one of carbon and steel brake assemblies to a second heat sink of another of the carbon and steel brake assemblies, the aircraft brake assembly for connection with a surrounding wheel via rotor disks of the respective heat sink, each heat sink including a pressure plate disk, rotor disks, stator disks and a backing plate disk, the brake assembly comprising the first heat sink, a torque tube connected with the stator disks of the first heat sink and including a backing plate with pad means engaging the backing plate disk, and a piston housing connected by means for connecting with the torque tube and having a plurality of pistons located a distance from the pressure plate disk, comprising the steps of:

disassembling the connecting means, piston housing, first heat sink and torque tube, and assembling the second heat sink, torque tube, connecting means and piston housing, wherein the second heat sink includes a pressure plate disk and a backing plate disk each having an increased axial thickness relative to axial thicknesses of the stator disks of the second heat sink, whereby the pistons are located substantially said distance from the pressure plate disk of the second heat sink.

2. The method in accordance with claim 1, wherein the second heat sink comprises a steel heat sink.

3. The method in accordance with claim 1, wherein the first heat sink comprises a carbon-carbon composite heat sink.

4. The method in accordance with claim 1, wherein the first heat sink comprises a carbon-carbon composite heat sink and the second heat sink comprises a steel heat sink.

5. An aircraft brake assembly designed as original equipment to be convertible from a first heat sink of one of carbon and steel brake assemblies to a second heat sink of another of the carbon and steel brake assemblies, the aircraft brake assembly for connection with a surrounding wheel via rotor disks of the respective heat sink, each heat sink including stator disks and the rotor disks, the brake assembly comprising a first heat sink, a torque tube connected with the stator disks of the first heat sink and including a backing plate with pad means engaging an adjacent disk, and a piston housing connected by means for connecting with the torque tube and having a plurality of pistons located a distance from an axial end of the first heat sink, the brake assembly enabling:

disassembly of the connecting means, piston housing, first heat sink, torque tube, and assembly of the second heat sink with the torque tube, the connecting mean and the piston housing, the second heat sink including a pressure plate disk and a backing plate disk each having an increased axial thickness relative to axial thicknesses of the stator discs of the second heat sink, whereby the pistons are located substantially said distance from the pressure plate disk of the second heat sink.

6. The aircraft brake assembly in accordance with claim 5, wherein the second heat sink comprises a steel heat sink.

7. The aircraft brake assembly in accordance with claim 5, wherein the first heat sink comprises a carbon-carbon composite heat sink.

8. The aircraft brake assembly in accordance with claim 5, wherein the first heat sink comprises a carbon-carbon composite heat sink and the second heat sink comp a steel heat sink.

9. A method of converting an aircraft brake assembly designed as original equipment to be convertible from a first heat sink of one of carbon and steel brake assemblies to a second heat sink of another of the carbon and steel brake assemblies, the aircraft brake assembly for connection with a surrounding wheel via rotor disks of the respective heat sink, each heat sink including a pressure plate disk, rotor disks, stator disks and a backing plate disk, the brake assembly comprising the first heat sink, a torque tube connected with the stator disks of the first heat sink and including a backing plate with pad means engaging the backing plate disk, the first heat sink including a pressure plate disk and a backing plate disk each having an increased axial thickness relative to axial thicknesses of the stator disks of the first heat sink, and a piston housing connected by means for connecting with the torque tube and having a plurality of pistons located a distance from the pressure plate disk, comprising the steps of:

disassembling the connecting means, piston housing, first heat sink and torque tube, and assembling the second heat sink, torque tube, connecting means and piston housing, whereby the pistons are located substantially said distance from a pressure plate disk of the second heat sink.

10. The method in accordance with claim 9, wherein the second heat sink comprises a carbon-carbon composite heat sink.

11. The method in accordance with claim 9, wherein the first heat sink comprises a steel heat sink.

12. The method in accordance with claim 9, wherein the first heat sink comprises a steel heat sink and the second heat sink comprises a carbon-carbon composite heat sink.

13. An aircraft brake assembly designed as original equipment to be convertible from a first heat sink of one of carbon and steel brake assemblies to a second heat sink of another of the carbon and steel brake assemblies, the aircraft brake assembly for connection with a surrounding wheel via rotor disks of the respective heat sink, each heat sink including stator disks and the rotor disks, the brake assembly comprising a first heat sink, a torque tube connected with the stator disks of the first heat sink and including a backing plate with pad means engaging an adjacent disk, the first heat sink including a pressure plate disk and a backing plate disk each having an increased axial thickness relative to axial thicknesses of the stator disks of the first the sink, and a piston housing connected by means for connecting with the torque tube and having a plurality of pistons located a distance from an axial end of the first heat sink, the brake assembly enabling:

disassembly of the connecting means, piston housing, first heat sink, torque tube, and assembly of the second heat sink with the torque tube, the connecting means and the piston housing, whereby the pistons are located substantially said distance from a pressure plate of the second heat sink.

14. The aircraft brake assembly in accordance with claim 13 wherein the first heat sink comprises a steel heat sink.

15. The aircraft brake assembly in accordance with claim 13, wherein the second heat sink comprises a carbon-carbon composite heat sink.

16. The aircraft brake assembly in accordance with claim 13, wherein the first heat sink comprises a steel heat sink and the second heat sink comprises a carbon-carbon composite heat sink.

* * * * *